United States Patent
Sonalker

(10) Patent No.: US 11,940,815 B1
(45) Date of Patent: Mar. 26, 2024

(54) APPARATUS AND METHODS FOR AUTONOMOUSLY CONTROLLING VEHICLES AT A SPECIFIED LOCATION

(71) Applicant: STEER-Tech, LLC, Annapolis Junction, MD (US)

(72) Inventor: Anuja Sonalker, Ellicott City, MD (US)

( * ) Notice: Subject to any disclaimer, the term of this patent is extended or adjusted under 35 U.S.C. 154(b) by 25 days.

(21) Appl. No.: 17/939,089

(22) Filed: Sep. 7, 2022

(51) Int. Cl.
*G05D 1/02* (2020.01)
*G01C 21/36* (2006.01)
*G05D 1/00* (2006.01)

(52) U.S. Cl.
CPC ....... *G05D 1/0291* (2013.01); *G01C 21/3682* (2013.01); *G05D 1/0088* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 10,821,973 | B2 | 11/2020 | Glebov |
| 2018/0376305 | A1* | 12/2018 | Ramalho de Oliveira ................. H04W 4/44 |
| 2019/0212737 | A1* | 7/2019 | Sonalker .............. G06V 20/586 |
| 2020/0207338 | A1 | 7/2020 | Cho |
| 2020/0209877 | A1 | 7/2020 | Yoon |
| 2021/0097587 | A1 | 4/2021 | Gao |
| 2021/0309212 | A1* | 10/2021 | Sonalker ............ G01C 21/3685 |
| 2021/0309213 | A1* | 10/2021 | Sonalker ............ B62D 15/0285 |

OTHER PUBLICATIONS

Alta Densidad; Hyundai Electric Vehicle Wireless Charging & Automated Valet Parking System; (YouTube); uploaded Jan. 3, 2019; https://www.youtube.com/watch?v=IBN89c-r-dl.

* cited by examiner

*Primary Examiner* — Alan D Hutchinson
(74) *Attorney, Agent, or Firm* — Caldwell Intellectual Property Law

(57) ABSTRACT

Aspects relate to apparatus and methods for autonomously controlling vehicles at a specified location. Apparatus includes a processor configured to receive a map of a location, communicate with a plurality of vehicles at the location, and communicate with a monitor device. Communicating with the plurality of vehicles includes receiving status data from the vehicles and transmitting a waypath to the vehicles.

20 Claims, 5 Drawing Sheets

APPARATUS AND METHODS FOR AUTONOMOUSLY CONTROLLING VEHICLES AT A SPECIFIED LOCATION

FIELD OF THE INVENTION

The present invention generally relates to the field of computerized vehicle controls. In particular, the present invention is directed to apparatus and methods for autonomously controlling vehicles at a specified location.

BACKGROUND

Currently, a lot of time is wasted during the process of parking/unparking, fueling, loading of a delivery truck. There is a need for an apparatus and method to perform these functions while unmanned to increase efficiency in a driver's time.

SUMMARY OF THE DISCLOSURE

In an aspect an apparatus for autonomously controlling vehicles at a specified location includes at least a processor, and a memory communicatively connected to the at least a processor, the memory containing instructions configuring the at least a processor to: receive a map of a location, wherein the map comprises a parking location and a fueling location, communicate with a plurality of vehicles at the location, wherein communicating further comprises: receiving status data from the plurality of vehicles, and transmitting a waypath to the plurality of vehicles, and communicate with a monitor device, wherein the monitor device is configured to monitor movements of the plurality of vehicles.

In another aspect, a method for autonomously controlling vehicles at a specified location includes receiving, by a processor, a map of a location, wherein the map comprises a parking location and a fueling location, communicating, by the processor, with a plurality of vehicles at the location, wherein communicating further comprises: receiving status data from the plurality of vehicles, and transmitting a waypath to the plurality of vehicles, and communicating, by the processor, with a monitor device, wherein the monitor device is configured to monitor movements of the plurality of vehicles.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for autonomously controlling vehicles at a specified location. In an embodiment, a map of a specified location communicated to an autonomous vehicle, so that the autonomous vehicle may perform unmanned functions at the specific location, such as going to a parking location, fueling location, maintenance location, loading location, unloading location, and the like.

Aspects of the present disclosure can be used to efficiently use human time for delivery vehicles. A driver of a vehicle may only get into the vehicle when needed, i.e. to drive the vehicle away from the specified location. Tasks, such as queuing the vehicle for maintenance, waiting for fuel for the vehicle, and the like be handled while unmanned, allow the human (driver) to use their time for delivery, loading the truck, or the like. Aspects of the present disclosure may send the same waypath to multiple vehicles. The waypath may include places for the vehicle to get refueled, maintenance, and the like.

Figure 1:
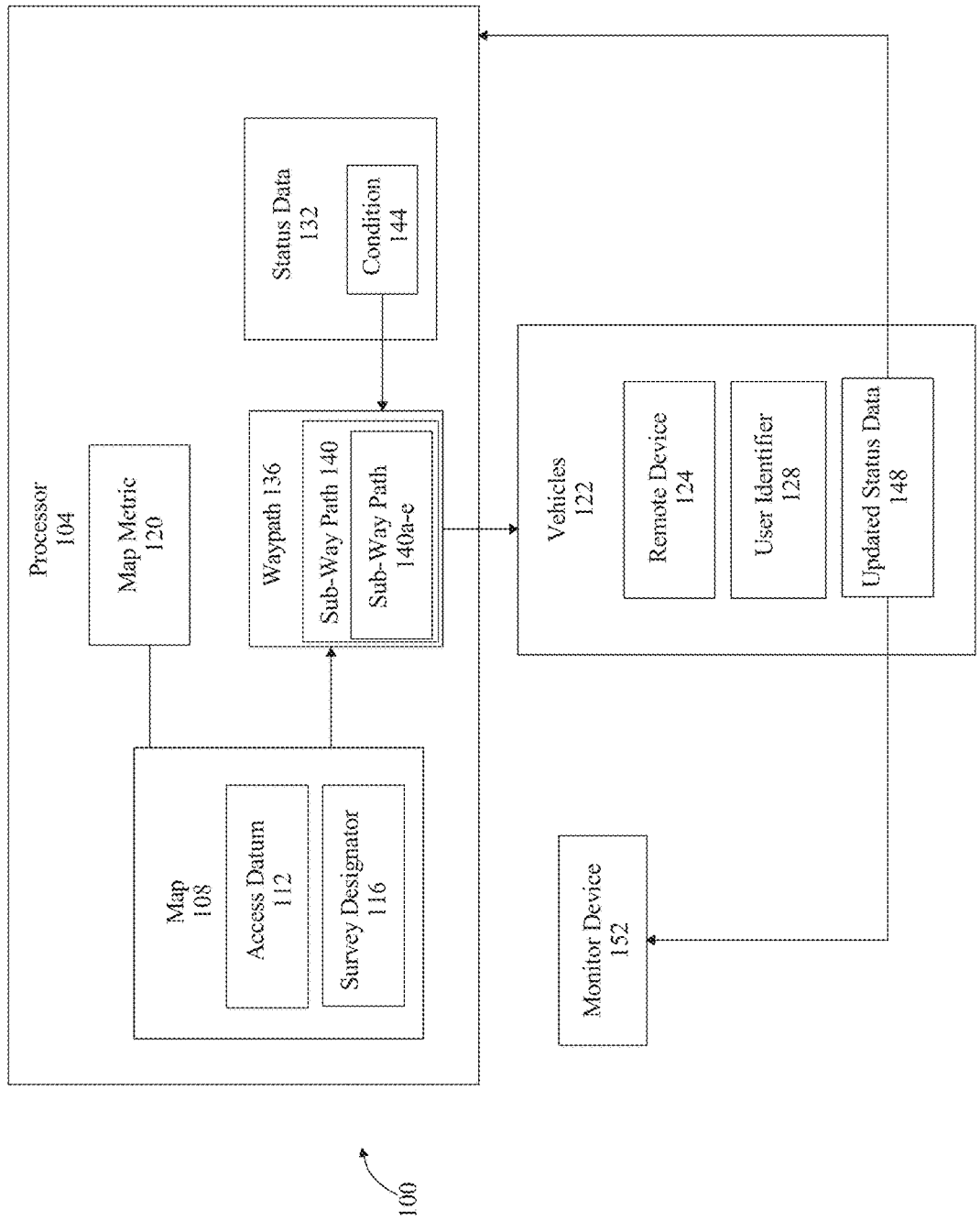
FIG. 1 is a block diagram illustrating an exemplary apparatus for autonomously controlling vehicles at a specified location.

Referring now to FIG. 1, an exemplary embodiment of an apparatus 100 for autonomously controlling vehicles at a specific location. Vehicles, such as vehicle 122 as discussed below, may include any vehicle such as a car, truck, e-bike, scooter, boat, or the like. A car and/or a truck may include delivery vehicles/transport vehicles, to deliver mail, food, cargo, people or the like. Apparatus 100 may use mapping to autonomously control vehicles. As used in this disclosure, "mapping" is a process of generating a symbolic representation, i.e., a map, of a geographic location, for example without limitation a parking lot and surrounding areas. Mapping may include generation of machine and/or human readable maps. In some cases, mapping may be performed with requisite specificity that it may be understood as world modeling. As used in this disclosure, "world modeling" is a process of generating a machine-readable model of a world surrounding a device, such that the device is able to function autonomously by using at least in part the model. As used in this disclosure, "autonomous" is an attributive term referring to an ability of a device, i.e., machine, to function without human intervention. The society of Automotive Engineers (SAE) has defined six different levels (0-5) to categorize the type of automation a vehicle may be configured to perform. Levels 0-3 all require a driver and cannot travel from a first point to a second point without any human interaction during the trip. Level 4 vehicles are configured to perform all safety critical driving functions and monitor roadway conditions for an entire trip between a first point and a second point without any human interaction during the trip. However, level 4 vehicles are limited according to their corresponding operational design domain (ODD). Level 5 vehicles may perform all driving tasks under any conditions. The SAE levels for automated vehicles have been adopted by various entities including the National Highway Traffic Safety Administration. As used in this disclosure, an "autonomous vehicle" is fully autonomous and able to drive without human oversight; for example, in some cases, an autonomous vehicle may operate at a SAE automation level of 4. In some cases, an autonomous vehicle may operate without a human present within the vehicle.

With continued reference to FIG. 1, apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 may be configured to receive a map 108 of a location. As used herein, a "map" is a diagrammatic representation of a location showing physical features. Physical features may include roads, traffic lights, areas of interests, and the like. A "location" as used herein, is an area of land. A location may include a point of interest. As used in this disclosure, a "point of interest" is geographic location, area, or point, to which a car may, generally speaking, be driven; for instance, a shop in a mall may be considered a point of interest, according to this disclosure, even though one would not drive their car into the mall to get to the shop but would instead park near the mall and walk to the shop. A point of interest may also include a distribution center, such as a distribution center for a retailer. A "distribution center", as used herein, is a product storage and shipping building wherein goods are shipped from. In an embodiment, a distribution center may be used as a hub for vehicles. A "hub" as used herein, is a centralized location for vehicles to return to. Distribution center may be a place for vehicles to refuel, park, receive maintenance, load and unload, and the like. A location may also include a delivery vehicle depot. A map 108 may be used by an autonomous vehicle to drive (e.g., park and/or be summoned) autonomously, for instance at a point of interest associated with the map 108. As described in greater detail below, a map 108 may include location data and corresponding designation data requisite to allow for automatic parking of an autonomous vehicle at a point of interest. For example, in some cases, a map 108 may include representations of one or more of geofences, waypoints, and or waypaths as well as designations indicating required information, such as parking location, fueling location, maintenance location, pick-up location, drop-off location, and the like.

Still referring to FIG. 1, in some embodiments, processor 104 may be configured to receive map 108 according to a mapping process. Mapping processes are discussed in further detail in U.S. patent application Ser. No. 17/351,685, filed on Jun. 18, 2021, entitled "METHODS AND SYSTEMS FOR MAPPING A PARKING AREA FOR AUTONOMOUS PARKING", is incorporated in its entirety herein.

With continued reference to FIG. 1, map 108 may include an access datum 112. As used in this disclosure, an "access datum" is at least an element of data that represents accessibility of a map and waypaths associated with the given map. For example, in some cases, an access datum may indicate that a map is privately accessible, for example only to one user. Alternatively or additionally, in some cases, an access datum may indicate that a map is publicly accessible; for example, the map is widely accessible publicly to large audience. In still more cases, an access datum may indicate that a map is shared, for example, shared between a group of users. In some cases, a shared map may be able to be used by a plurality of users, such as without limitation at least a group of users, but the shared map is still not publicly accessible.

Still referring to FIG. 1, in some embodiments, map 108 may include at least a permission datum. In some cases, permission datum indicates which user and/or a group of users have permission to read (e.g., view), write (e.g., modify and/or survey), and/or access (e.g., access datum 112) a map depending upon the permission datum. In some cases, map 108 may include at least an owner datum. An owner datum may indicate which user "owns" or controls map 108. In some cases, a user who maps, such as a surveyor, map 108 may be indicated as the map 108 owner. Alternatively and/or additionally, in some cases, another user may be indicated as owner of a map 108. In some other embodiments, substantially one user, a superuser, or no user may own substantially all parking maps 108. In some cases, only a parking map owner may access, edit, modify, and/or delete map 108 and/or access datum 112. In some cases map 108 may additionally include a group datum. In some cases, a group datum may indicate what group, for example what group of users, is associated with map 108. In some cases, a user belonging to map 108 group may be able to access, edit, modify, and/or delete parking map.

Still referring to FIG. 1, in some embodiments, processor 104 may be further configured to store map 108 on a map datastore. As used in this disclosure, a "map datastore" is a location, virtual, digital, and/or physical, within which a parking map is stored. Non-limiting exemplary map datastores include databases, database tables, filesystems, and the like. An exemplary database which in some embodiments may be used as a map datastore is NOSQL. In some cases, a different map datastore will be used to store parking maps 108 according to their access datum 112. For example, in some cases, all publicly accessible parking maps may be stored on substantially the same map datastore. Likewise, private parking maps may be stored on one or more private map datastores. In some cases, map datastore may correspond to one or more of access datum 112, permission datum, owner datum, and/or group datum.

With continued reference to FIG. 1, map 108 may include at least a survey designator 116. As used in this disclosure, a "survey designator" is a designator or label associated with a point of interest. For example, and without limitation, at least a survey designator 116 may include one or more of a point of interest designator, drop-off location designator, parking location designator, waypath designator, fueling designator, maintenance designator, pick-up location designator, and summoning path designator. As used in this disclosure, a "point of interest designator" is at least an element of data that symbolizes a point of interest. Non-limiting examples of point of interest (POI) designators include a POI name, a POI identification (i.e., serial) number, a POI positional coordinates, a POI descriptor, a POI characteristic, and the like. At least a survey designator 116 may include a drop-off location designator for a drop-off location associated with point of interest. As used in this disclosure, a "drop-off location" is a geographic location, area, or point, where an autonomous vehicle 122 may be driven to and dropped off for automatic parking. In some embodiments, autonomous vehicle 122 may be dropped off at a drop-off location and the autonomous vehicle 122 may automatically park itself from the drop-off location without intervention from a human driver. The term "drop-off" may be considered as relating to a passenger (and/or driver) of autonomous vehicle 122 being dropped off, for example at a point of interest; alternatively or additionally, "drop off" may be considered to relate to the autonomous vehicle 122 itself being dropped off, for example for automatic parking. Alternatively or additionally, "drop-off" may refer to a location wherein cargo may be unloaded from vehicle 122. As used in this disclosure, a "drop-off location designator" is at least an element of data that symbolizes a drop-off location. Non-limiting examples of drop-off location designators include a drop-off location name, a drop-off location identification (i.e., serial) number, a drop-off location positional coordinates, a drop-off location descriptor, a drop-off location characteristic, and the like.

With continued reference to FIG. 1, in some embodiments, at least a survey designator 116 may include a parking location designator for a parking location associated with point of interest. As used in this disclosure, a "parking location" is a geographic location, area, or point where an autonomous vehicle 122 may automatically park. Non-limiting examples of parking locations include parking lots, parking garages, on-street parking, temporary parking areas (e.g., fields, closed roads, and the like), driveways, garages, and the like. As used in this disclosure, a "parking location designator" is at least an element of data that symbolizes a parking location. Non-limiting examples of parking location designators include a parking location name, a parking location identification (i.e., serial) number, a parking location positional coordinates, a parking location descriptor, a parking location characteristic, and the like.

With continued reference to FIG. 1, in some embodiments, at least a survey designator 116 may include a waypath designator for a parking path between drop-off location, fueling location, maintenance location, and parking location. A waypath may include all aforementioned locations or only a few of the aforementioned locations. Additional disclosure about waypaths is discussed in further detail below. As used in this disclosure, a "waypath" is a path for an autonomous vehicle to follow. In some embodiments, a waypath may include a plurality of sub-waypaths. Sub-waypaths are discussed in further detail below. A waypath may include, without limitation roads, highways, driveways, parking lots, parking garages, and the like. As used in this disclosure, a "waypath designator" is at least an element of data that symbolizes a waypath. Non-limiting examples of waypath designators include a waypath name, a waypath identification (i.e., serial) number, a waypath positional coordinates, a waypath descriptor, a waypath characteristic, and the like.

With continued reference to FIG. 1, in some embodiments, at least a survey designator 116 may include a fueling location designator. As used in this disclosure, a "fueling location" is a geographic location, area, or point, where an autonomous vehicle 122 (also referred to herein as "vehicle") may drive to for fueling. Fueling may include electric charging, gasoline fueling, diesel fueling, hydrogen fueling, or the like. Once a vehicle 122 arrives at a fueling location, a person, such as a fueling attendant, may be alerted and fuel the vehicle 122. Non-limiting examples of fueling designators include a fueling name, a fueling identification (i.e., serial) number, a fueling positional coordinates, a fueling descriptor, a fueling characteristic, and the like.

Continuing to reference FIG. 1, in some embodiments, at least a survey designator 116 may include a maintenance location designator, As used in this disclosure, a "maintenance location" is a geographic location, area, or point, where an autonomous vehicle 122 may drive to for maintenance. Maintenance of the vehicle 122 may include tire rotations, tire changes, engine maintenance, oil changes, spark plug changes, brake fluid maintenance, and the like. Maintenance of the vehicle 122 may also include maintenance of computer systems on the vehicle 122. Maintenance of a vehicle 122 may be determined as necessary based on the milage of the vehicle 122, drive time, or the like. Once a vehicle 122 arrives at a maintenance location, a person, such as a technician, may service the vehicle 122. Non-limiting examples of maintenance designators include a maintenance name, a maintenance identification (i.e., serial) number, a maintenance positional coordinates, a maintenance descriptor, a maintenance characteristic, and the like.

With continued reference to FIG. 1, in some embodiments, at least a survey designator 116 may include a pick-up location designator for a pick-up location associated with point of interest. As used in this disclosure, a "pick-up location" is a geographic location, area, or point, where an autonomous vehicle 122 may drive to and pick up goods. A good may be cargo, person, or the like. In some embodiments, autonomous vehicle 122 may autonomously drive, without intervention from a human driver to a pick-up location and the human driver may pick-up the autonomous vehicle 122 at the pick-up location. The term "pick up" may be considered as relating to a passenger (and/or driver) of autonomous vehicle 122 being picked up, for example at a point of interest after the autonomous vehicle 122 has been summoned; alternatively or additionally, "pick up" may be considered to relate to the autonomous vehicle 122 itself being picked up, for example from automatic parking. In some embodiments, the pick-up location may be a loading location, wherein cargo may be loaded onto the vehicle 122. As used in this disclosure, a "pick-up location designator" is at least an element of data that symbolizes a pick-up location. Non-limiting examples of pick-up location designators include a pick-up location name, a pick-up location identification (i.e., serial) number, a pick-up location positional coordinates, a pick-up location descriptor, a pick-up location characteristic, and the like.

With continued reference to FIG. 1, in some embodiments, at least a survey designator may include a summoning path designator for a summoning path between parking location and pick-up location. As used in this disclosure, a "summoning path" is a path an autonomous vehicle 122 takes from a parking location to a pick-up location. A summoning path may be a sub-waypath. A summoning path may include, without limitation roads, highways, driveways, parking lots, parking garages, and the like. As used in this disclosure, a "summoning path designator" is at least an element of data that symbolizes a summoning path. Non-limiting examples of summoning path designators include a summoning path name, a summoning path identification (i.e., serial) number, a summoning path positional coordinates, a summoning path descriptor, a summoning path characteristic, and the like.

With continued reference to FIG. 1, computing device may generate a first map metric 120 associated with map 108. As used in this disclosure, a "map metric" is a quantifiable measure representative of a map's suitability for a specific or general purpose. For example, in some cases, a map metric may be representative of an aggregation of user feedback of the map. Alternatively or additionally, in some cases, a map metric may be representative of utilization of a map; for example, as a measure of how regularly the parking map is used. In some cases, a map metric representing utilization of a map may be normalized and/or standardized according to statistical analysis methods and/or known traffic and/or global map utilization metrics. In some cases, a map metric may be representative of number and/or proportion of autonomous parking failures and/or successes resulting from success of a map. In an embodiment, map metric 120 may be calculated using a machine-learning model. Machine-learning model may use training data that includes inputs such as historical map usage statistics and outputs may include one or more data and/or data types represented by map metric 120. In some cases, training data may include inputs that include one or more maps 108 and outputs that include a map metric 120. Machine-learning model may receive an input of map 108 and output a map metric 120. Apparatus 100 may include a machine-learning module/model consistent with a machine-learning module/model discussed in FIG. 3.

Still referring to FIG. 1, in some embodiments, processor 104 may be additionally configured to receive a user feedback associated with map 108. As used in this disclosure, a "user feedback" is any element of data originating from a user, for instance related to an individual parking map and/or a surveyor. In some cases, a user feedback may include a ranking, for example a number of 1 through 5-star ranking. In some cases, a user feedback may include unstructured data, for example in a form such as a text or audio user review. In some cases, user feedback including unstructured data may be processed using one or more of natural language processing algorithms and/or supervised or unsupervised machine-learning processes to categorize and or score the user feedback, such that it may be incorporated into a metric, such as a map metric or a surveyor metric. In some cases, a user feedback may include a binary or categorical designation, for example a "like" or a "dislike" indication. In some cases, processor 104 may be configured to update map metric 120 as a function of user feedback. In some cases, one or more algorithms or calculations may be used to generate and/or update map metric. For example, in some cases, data of different types (e.g., map usage and user feedback) may be aggregated and represented by map metric. Aggregation may include any known mathematical method of aggregation, including normalizing, addition, multiplication, exponential relationships, and the like. In some cases, data of different types is weighted according to different weights. Weights may represent a relative measure of importance for a particular data and/or data type represented by map metric. In some cases, weights may be determined by a programmer or another expert user or designer. Alternatively or additionally, in some cases, determination of weight of different data and/or data types may be performed by using one or more machine-learning algorithms. In some cases, at least a machine-learning process, for example a machine-learning model, may be used to generate and/or update map metric 120 by processor 104. Processor 104 may use any machine-learning process described in this disclosure for this or any other function.

With continued reference to FIG. 1, processor 104 communicates with a plurality of vehicles 122 at the location. In an embodiment, the plurality of vehicles 122 may be delivery vehicles at a distribution center. In an embodiment, vehicles 122 may include remote devices 124, such that each vehicle 122 may include a remote device 124. Remote devices 124 may communicate with processor 104. Processor 104 may communicate map 108 to remote devices 124 of the plurality of vehicles. In some embodiments, processor 104 may only communicate with vehicles/remote devices 124, when vehicles 122 are at the location. As used in this disclosure, a "remote device" is a computing device that is remote to the processor 104; remote device may be geographically remote, i.e., located in a different place, to computing device and/or remote device may be cybernetically remote, i.e., located on a different network, than the computing device. Remote device 124 may be communicative (or said another way communicatively connected) with processor 104. For example, a remote device may be connected to processor 104 by way of one or more networks. Non-limiting examples of networks include Ethernet, Internet, local area networks, wide area networks, wireless networks, cellular networks, and the like. In some cases, remote device, such as without limitation remote device 124, may include an autonomous vehicle 122.

With continued reference to FIG. 1, processor 104 may selectively communicate map 108 to remote device 124. As used in this disclosure, "selectively communicate" is a process of conditional communication. In some cases, map 108 may be selectively communicated to remote device 124 as a function of access datum 112. For example, if access datum 112 indicates that map 108 is intended for public accessibility, then the map 108, in some cases, may be communicated to substantially any remote device requesting the map 108. Alternatively, if access datum 112 indicates that access to map 108 is to be limited to one or more individual users and/or remote devices, processor 104 may first ensure that a requesting remote device or user has access to the map 108 prior to selectively communicating the map 108.

With continued reference to FIG. 1, in some cases, computing device 108 may selectively communicate map 108 as a function of one or more permission datum, owner datum, and/or group datum. In some embodiments, access control may include one or more of authentication, authorization, and audit. In some cases, access control may substantially include only access approval, for example without limitation whereby processor 104 may make a decision to grant or reject an access to a map 108 from an already authenticated user, based on what the user is authorized to access, for example as indicated by an access datum. Authentication and access control in some cases may be combined into a single operation, so that access is approved based on successful authentication, or based on an anonymous access token. Authentication methods and tokens may include passwords, biometric analysis, physical keys, electronic keys and devices, hidden paths, social barriers, and monitoring by humans and automated systems. According to some embodiments of an access control methods, entities that can perform actions on the system may be referred to as subjects (e.g., user) and entities representing resources to which access may need to be controlled may be referred to as objects (e.g., map 108). Subjects and objects, in some cases, may both be represented within software, rather than as human users. This is the case as typically any human users can only have an effect on the system via the software entities that they control. In some cases, software may represent a subject according to a descriptor, such as a user identifier 128. In this case, substantially all processes started by a user, by default, may have the same authority, permission, and/or access.

With continued reference to FIG. 1, processor 104 may selectively communicate map 108 by using one or more access control methods. As used in this disclosure, "access control" is the selective restriction of access to a resource, for example a map 108.

Still referring to FIG. 1, in some embodiments, remote device 124 may be configured to communicate a user identifier 128 associated with a user of the remote device 124 to processor 104. As used in this disclosure, a "user identifier" is at least an element of data that uniquely represents a user, such that substantially one user identifier represent one user and one user is represented by one user identifier. Exemplary non-limiting user identifiers include usernames, codes, numbers, for example driver's license numbers and/or serial numbers, and the like. In some cases, a user identifier may include a surveyor identifier. In some cases, processor 104 may be configured to authenticate a user of first remote device 124. In some cases, processor 104 may be configured to authenticate a user as a function of a user identifier 128. As used in this disclosure, "authenticating" is the act of proving an assertion, such as an identity of a computing device and/or a user. In some cases, authentication may include verifying a user's driver's license number.

Still referring to FIG. 1, in some embodiments, in some cases, authentication of a user and/or a computing device may include authentication methods from three categories, based on authentication factor: (1) something the user and/or the computing device knows, (2) something the user and/or the computing device has, and (3) something the user and/or the computing device is. Each authentication factor covers a range of elements used to authenticate or verify a user's and/or computing device's identity prior to being granted access to a map 108. In some cases, authentication may include methods using at least one authentication factor. Authentication factors may include knowledge factor, ownership factor, and/or inference factor. Knowledge factors, something user and/or computing device knows, may include one or more of a password, partial password, pass phrase, personal identification number (PIN), challenge response (i.e., user must answer a question or pattern), security question, and the like. Ownership factors, something user and/or computing device has, may include wrist band, ID card, security token, implanted device, cell phone with built-in hardware token, software token, cell phone holding a software token, and the like. Inference factors, something user and/or computing device is or does, may include fingerprint, retinal pattern, DNA sequence, signature, face, voice, unique bio-electric signals, other biometric identifier, and the like. In some cases, authentication may include single-factor authentication. As the name implies, single factor authentication uses only one factor to authenticate user and/or computing device. Likewise, multi-factor authentication involves two or more authentication factors. Two-factor authentication is a special case of multi-factor authentication involving exactly two factors.

Still referring to FIG. 1, in some embodiments, processor 104 may be configured to receive site-specific driving rules associated with point of interest. In some cases, map 108 may include site-specific driving rules. As used in this disclosure, "site-specific driving rules" are local rules which govern an autonomous vehicle 122 only at a specific point of interest; site-specific driving rules are in contrast to global driving rules which govern an autonomous vehicle 122 at substantially all points of interest. In some cases, a user may input site-specific driving rules into processor 104 directly or by way of another computing device in communication with the processor 104. Alternatively and/or additionally, a remote device 124, 132 may communicate site-specific driving rules to processor 104. In some cases, a user may input site-specific driving rules into remote device 124, 132.

Additional disclosure on controlling usage of maps is found in U.S. patent Ser. No. 17/351,740, filed on Jun. 18, 2021, entitled "METHODS AND SYSTEMS FOR CONTROLLING USAGE OF PARKING MAPS FOR AUTONOMOUS VEHICLES", which is hereby incorporated in its entirety by reference herein.

Continuing to reference FIG. 1, communicating with a plurality of vehicles 122 further includes receiving status data 132 from the plurality of vehicles 122. "Status data", as used herein, is information relating to the vehicle 122. Status data 132 may include information relating to the conditions of a vehicle 122. "Conditions" as used herein, refer to the state of a vehicle. In an embodiment, status data 132 may include information on fuel levels, tire pressure levels, odometer milage, and the like. Status data 132 may also include location data, date, time, vehicle driving hours, and the like. Status data 132 may be transmitted by remote device 124 to processor 104 by way of wireless communication. Communication may occur through any network, as discussed above, or through 4G LTE, 5G, Wi-Fi, broadband, satellite, Li-Fi, and the like. Status data 132 include data on conditions from each vehicle 122 of the plurality of vehicles. Status data 132 may be used to determine a waypath 132 for a vehicle 122. A waypath 136 may include a plurality of sub-waypaths 140a-e. As used in this disclosure, a "sub-waypath" is an element of a waypath that represents at least a portion of a waypath. In some cases, sub-waypath may include one or more waypoints along a path. In an embodiment, a plurality of vehicles 122 may follow waypath 136 with sub-waypaths 140a, 140b, and 140c. However, when an identified condition, such as low fuel, is present, the vehicles 122 with that condition may follow a waypath 136 with sub-waypaths 140a, 140b, 140e, and 140c.

Continuing to reference FIG. 1, processor 104 may identify a condition 144 of a vehicle 122 using status data 132. Alternatively, a condition 144 may be identified by a user of apparatus 100. A user may be a fleet manager of the fleet of vehicles, a driver of a vehicle 122, a manager of the specified location, or the like. A condition may include low fuel levels, low tire pressure, oil change needed, or the like. A user may set a threshold to determine low levels, such as 20% fuel for low fuel level or below 40 PSI for low tire pressure, or the like. Alternatively, a supervised or unsupervised machine-learning process may be used to categorize status data 132 to determine a condition of a vehicle 122. Status data 132 may be categorized by conditions relating to fuel, maintenance, or the like. The categories may each contain a threshold where if the vehicle 122 meets the threshold, a different waypath 136 may be needed. In an embodiment, a machine-learning model may be trained with training data containing status data that has been categorized by conditions. For example, training data may include an input of fuel levels and an output of categorized fuel levels into categories such as "needs to be refueled", or "no refuel needed". Training data may be updated with each iteration of the machine-learning model such that the model is iterative and adaptable with new training information.

Continuing to reference FIG. 1, a sub-waypath 140 may be associated with a condition 144. In an embodiment, a user may determine that a fuel level equal to or lower than 20% is associated with a sub-waypath from the drop-off location to the fueling location. In another embodiment, a user may determine that a tire air pressure lower than 40 PSI is associated with a sub-waypath to the maintenance location. There may be a sub-waypath 140 for each combination of two locations/designators on map 108. For example, there may be a sub-waypath 140 from the drop-off location to the fueling location, from the drop-off location to the parking location, from the drop-off location to the maintenance location, from the maintenance location to the fueling location, from the fueling location to the maintenance location, from the maintenance location to the pick-up location, or the like. In the case wherein a vehicle 122 has more than one condition, processor 104 may rank conditions to determine the order of sub-waypaths 140 for the waypath 136. As used in this disclosure, a "ranking" is a relationship between a set of items such that, for any two items, the first is either "ranked higher than", "ranked lower than" or "ranked equal to" the second. In some cases, a ranking may be understood as a weak order or total preorder of objects. In some cases, a ranking may allow detailed measures, such as map metric, to be reduced to a sequence of ordinal numbers; rankings, therefore, may make it possible to evaluate complex information according to certain criteria.

In some cases, ranking a condition may include statistical ranking. Statistical ranking may include one or more data transformation in which numerical or ordinal values are replaced by their rank when the data are sorted. For example, the numerical data 3.4, 5.1, 2.6, 7.3 are observed, the ranks of these data items would be 2, 3, 1, and 4, respectively. For example, the ordinal data hot, cold, warm would be replaced by 3, 1, 2. In these examples, the ranks are assigned to values in ascending order. In some cases, ranking conditions may include rearranging conditions into an ascending or a descending order. In some cases, one or more statistical calculations may be employed prior to, during, and/or after ranking parking map list. Non-limiting exemplary calculations include Friedman test, Kruskal-Wallis test, Rank products, Spearman's rank correlation coefficient, Wilcoxon rank-sum test, Wilcoxon signed-rank test, Van der Waerden test, and the like.

In some cases, at least a machine-learning process, for example a machine-learning model, may be used to rank conditions by processor 104. Machine-learning model may use training data that may include examples of inputs such as a condition and outputs such as a rank of the condition. Machine-learning model may use training data including previously ranked conditions to generate a ranking for conditions from status data 132. Training data may include a plurality of data sets such that training data may be updated each time machine-learning model is used. In an embodiment, machine-learning model may be iterative. Processor 104 may use any machine-learning process described in this disclosure for this or any other function. In some cases, processor 104 may selectively communicate one of map 108 and/or sub-waypoints. Processor 104 may rank conditions based on importance. Alternatively, a user of apparatus 100 may rank conditions based on importance. In an embodiment, maintenance may be ranked higher than fueling. In this embodiment, a vehicle 122 may travel from the drop-off location to the maintenance location, to the fueling location, to the parking location, to the pick-up location. In an embodiment, ranking may be used to formulate a waypath 136 to be transmitted to the vehicles 122. Ranking may be used to prioritize various locations within map 108 to determine in which order the vehicles 122 should travel.

Continuing to reference FIG. 1, a waypath 136 may include a default waypath. A default waypath may be transmitted to vehicles 122 with no conditions. A default waypath may include driving (autonomously) from the drop-off location to the parking location to the pick-up location. A default waypath may be determined by a user of apparatus 100.

Continuing to reference FIG. 1, alternate waypaths with various sub-waypaths 140 may be conditionally transmitted to and/or performed autonomously by a plurality of vehicles 122 as a function of the status data 132. In an embodiment, all vehicles 122 that only need fuel may perform a waypath 136 that includes going to the drop-off location to the fueling location to the parking location to the pick-up location. In another embodiment, all vehicles 122 that need fuel and maintenance may perform a waypath 136 that includes going to the drop off location, to the maintenance location, to the fueling location, to the parking location, and finally to the pickup location. In this embodiment, processor 104 or a user may have ranked maintenance higher than fueling, and as such, the vehicles 122 go to the maintenance location first. Alternatively, or additionally, a user may set waypaths 136 a vehicle may travel in. For example, a user may determine that there may be six set waypaths 136: a default waypath, a waypath including only fueling, and a waypath including fueling and then maintenance, and a waypath including only maintenance. In this example, vehicles 122 may only be sent one of the five waypaths as a function of their conditions, which may be determined by a user or by processor 104. Processor 104 may transmit a single command to a subgroup of vehicles 122 within the plurality of vehicles with the same conditions. That single command may include conditional waypaths based on the conditions. In an embodiment, processor 104 may send a single command containing conditional waypath 136/sub-waypath 140. Each vehicle 122 may drive to various locations depending upon its individual state compared with conditionals. For example, vehicles that are low on fuel may drive to a fueling location, vehicles that are not low on fuel may drive to a parking location, and the like. The determination of waypaths 136 may be determined at the car and not from processor 104.

Still referencing FIG. 1, waypath 136 may include conditional logic to link sub-waypaths 140. For example, waypath 136 may be transmitted to vehicles 122 with all possible sub-waypaths 140. Waypath 136 may be transmitted with conditional logic wherein each vehicle 122 may drive to different waypoints/locations based on the conditions on the vehicle 122 (determined from status data 132). As discussed above, all vehicles 122 may be transmitted one command, such as "perform tasks" and each individual vehicle 122 may determine which sub-waypaths 140 to use as a function of status data 132. For example, a vehicle 122 may be dropped off at a drop-off location and receive a command from processor 104 to "perform functions" and a waypath 136. Vehicle 122 may have status data 132 of "low fuel" and "no maintenance needed". Waypath 136 may include conditional logic such as "if fuel is low, go to fueling location, else go to parking location". In this instance, vehicle 122 would drive to a fueling location and then a parking location. Conditional logic may also include if-then statements involving maintenance location, drop-off location, pick-up location, fueling location, the combination thereof, and the like.

Still referencing FIG. 1, waypath 136/sub-waypaths 140 may be conditionally transmitted to vehicles 122 as a function of access datum 112. As discussed above, access datum 112 may be used to indicate accessibility of a map 108. In addition to accessibility of a map, access datum 112 may indicate accessibility of a waypath 136/sub-waypath 140. In an embodiment, processor 104 may send a single command containing waypaths 136/sub-waypaths 140 to different groups of vehicles within the total group of vehicles 122. This may be done based on an attribute of a vehicle 122. Attributes of a vehicle 122 may include maximum package size, maximum weight capacity, maximum package capacity, delivery range, vehicle height, vehicle size, and the like. These attributes may be contained within status data 132. Alternatively, grouping of vehicles may be arbitrary and/or include diverse vehicles. In some embodiments, vehicles may be grouped according to an identification number, such as a vehicle identifier, which may be transmitted to processor 104 in status data 132. A "vehicle identifier", similar to a user identifier, is defined as at least an element of data that uniquely represents a vehicle 122, such that substantially one vehicle identifier represents one vehicle and one vehicle is represented by one vehicle identifier. Exemplary non-limiting vehicle identifiers include usernames, codes, numbers, for example VIN numbers and/or serial numbers, and the like. The server may send commands only to the target group and/or the server may broadcast to all vehicles with conditional logic instructing only vehicles of the target group to perform according to the instructions. Therefore, in some cases, vehicles may be aware of their group membership. In some cases, the server will send a command (e.g., map 108 and/or waypath 136) only to a group of vehicles at the depot. The group may include some proportion of total number of fleet vehicles (e.g., 10%, 20%, 50%, or the like).

Still referring to FIG. 1, in some embodiments, processor 104 may validate waypath 136 and/or sub-waypaths 140. As sued in this disclosure, "validation" is a process of ensuring that which is being "validated" complies with stakeholder expectations and/or desires. Stakeholders may include users, administrators, point of interest stakeholders, drivers, surveyors, property managers, parking lot/garage staff, and the like. Very often a specification prescribes certain testable conditions (e.g., metrics) that codify relevant stakeholder expectations and/or desires. In some cases, validation includes comparing a product, for example waypath 136, against a specification. In some cases, computing device 104 may be additionally configured to validate the waypath 136 by segmenting validating the sub-waypaths 140 of waypath 136. In some cases, validating waypath 136 may include validating map 108. Processor 104 may validate map 108, for example prior to communicating the map 108 to a vehicle 122. Alternatively or additionally, in some cases, some or all validation processes may be performed using monitoring device 152. In some cases, at least a machine-learning process, for example a machine-learning model, may be used to validate map 108/waypath 136 by processor 104. Machine-learning model may include an input of a map 108/waypath 136 and an output of a classification such as "validated," "unvalidated," "compliant," "non-compliant," and the like. Machine-learning model may be trained using training data that includes examples of validated waypaths 136 and map 108. Machine-learning model may compare the waypath 136 in question to the waypaths in training data to determine a classification. Processor 104 may use any machine-learning process described in this disclosure for this or any other function.

Still referring to FIG. 1, in some embodiments, processor 104 may be configured to receive updated status data 148. Updated status data 148 may be received while the vehicles 122 are on waypath 136. Updated status data 148 may be transmitted at each sub-waypath 140. Alternatively, or additionally, updated status data 148 may be transmitted when the vehicles 122 reach the end of waypath 136. In an embodiment, processor 104 may adjust waypath 136 for the vehicles based on updated status data 148. Updated status data 148 may include coordinates of vehicle 122. Updated status data 148 may include updated conditions of vehicle 122 such as fuel levels, tire pressure levels, or the like. Updated status data 148 may include data on whether cargo has been loaded/unloaded from vehicle 122. This may be determined based on data on the weight of vehicle 122. Updated status data 148 may be used to ensure that vehicle 122 is on the correct waypath 136. In an embodiment, if fuel levels of vehicle 122 are determined to be low from status data 132 and updated status data 148 also reports fuel levels as low, this may indicate to a user/processor 104 that an error has occurred.

Continuing to reference FIG. 1, updated status data 148 may also be transmitted to a monitor device 152. As used herein, a "monitor device" is a remote device configured to surveil the vehicles 122. In an embodiment, monitor device 152 may be any remote device as discussed herein. Monitor device 152 may be communicatively connected to remote device 124 and processor 104. Monitor device 152 may store updated status data 148 in a database, such as any database ad discussed herein. Monitor device 152 may be in communication with a locating sensor. A locating sensor may be located in remote device 124 and/or a vehicle 122. As used in this disclosure, a "locating sensor" may be any sensor or plurality of sensors that can be used to detect information useful for determining a location of the sensor. Non-limiting examples of locating sensors include a global position sensor (GPS), a computer vision system, for example with pose estimation based upon feature tracking of objects, stereoscopic vision, radio-based locating sensors, for example RAdio Detection And Ranging (RADAR) and Ultra-Wideband, light-based locating sensors, for example Light Detection And Ranging (LiDAR), sound-based locating sensors, for example sound navigation and ranging (Sonar), ultrasound-based locating sensors, radio frequency identification (RFIS) sensors, Bluetooth, infrared-based locating sensors, cellular-based locating sensors, wireless local area network (WLAN) based sensors, laser-based locating sensors, and the like. In some cases, a locating sensor comprises a global positioning sensor.

Continuing to reference FIG. 1, each vehicle 122 of the plurality of vehicles 122 may include locally operated autonomous functions. As used herein "locally operated autonomous functions" refers to autonomous functions completed on each individual vehicle. In an embodiment, processor 104 may provide a waypath 136 to guide a plurality of vehicles 122 to a location (i.e. parking location, fueling location, etc.). However, the act of parking in a parking spot, etc. may be controlled locally by each vehicle 122. Each vehicle 122 may include a plurality of sensors and a processor to park a vehicle at a parking spot, fueling spot, etc. As used in this disclosure, an act of "parking" refers to moving of a vehicle to a specific location where it may be parked. A parked vehicle may be parked for short periods of time (e.g., seconds or minutes), for instance with an engine of the vehicle still running. Alternatively, vehicle may be parked for longer durations (e.g., minutes, hours, days, and the like), for instance with an engine within the vehicle turned off. Each vehicle may use combination of sensors, machine-learning, and machine vision to determine if a space proximal to a vehicle is suitable for parking the vehicle. Sensors may include proximity sensors, cameras, and the like. Sensors may be placed at various locations on vehicle 122 such as the front, the rear, the top, or the like. For example, processor 104 may transmit a waypath 136 to vehicles 122 that directs the vehicles 122 to go to a fueling location. At the fueling location, vehicles 122 may use locally operated autonomous functions to determine where to park at the fueling location. Monitor device 152 and/or processor 104 may receive data on locally operated autonomous functions through updated status data 148. In an embodiment, updated status data 148 may include data on whether the vehicles 122 have parked in proper location (fuel location, etc.). Additional disclosures on parking a vehicle is found in U.S. patent application Ser. No. 17/518, 793, filed on Nov. 4, 2021, entitled "METHODS AND SYSTEMS FOR PARKING A VEHICLE", is incorporated in its entirety herein. Additional disclosure on automatically parking a vehicle is found in U.S. patent application Ser. No. 16/242,102, filed on Jan. 8, 2018, entitled "AUTOMATED VALET SYSTEM", which is hereby incorporated in its entirety.

Still referring to FIG. 1, in some embodiments system 100 may provide for autonomous operation of a vehicle. Autonomous operation is contrasted with teleoperation, remote-operation, and human-guided operation which requires human operation.

Figure 2:
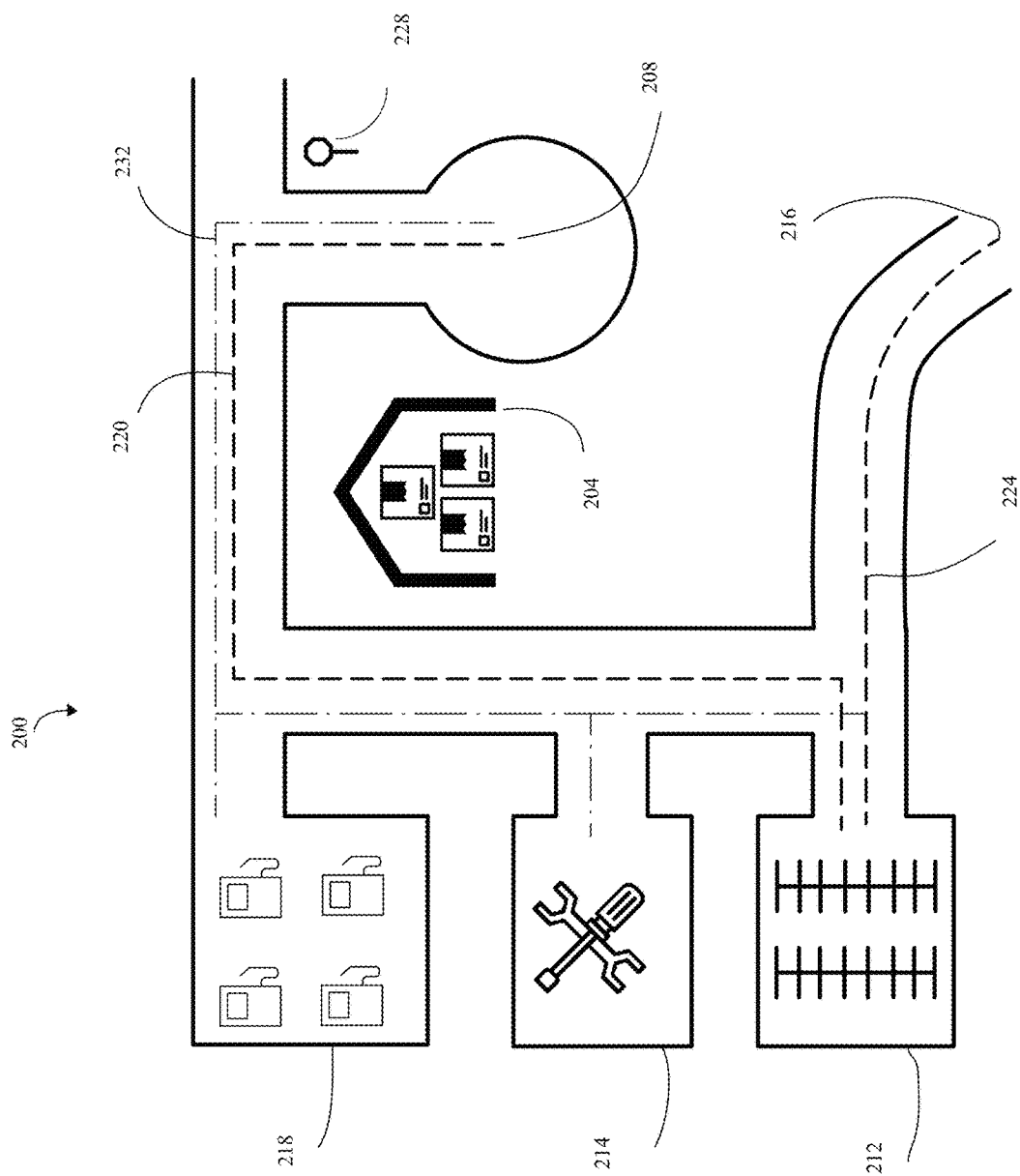
FIG. 2 illustrates an exemplary location including a point of interest.

Referring now to FIG. 2, an exemplary location 200 is illustrated with a point of interest 204. As described throughout, point of interest 204 may include a vehicle fleet depot, a distribution center, or the like. Point of interest 204 may be a place wherein a plurality of vehicles gathers, such as a hub. Point of interest 204 as illustrated in FIG. 2, is depicted as a non-limiting exemplary distribution center. Point of interest 204 has associated with it a drop-off location 208, a parking location 212, a maintenance location 214, a pick-up location 216, and a fueling location 218. In some cases, one or more of the above-mentioned locations may overlap and or include one another, for example drop-off location 208 and pick-up location 216 may include some or all of the same space. A parking path 220 may be located between drop-off location 208 and parking location 212. In some cases, parking path 220 is geographic path an autonomous vehicle will take to get from drop-off location 208 to parking location 212. A summoning path 224 may be located between parking location 212 and pick-up location 216. In some cases, summoning path 224 is a geographic path an autonomous vehicle will take to get from parking location 212 to pick-up location 216. In an embodiment, parking path 220 and summoning path 224 are sub-waypaths, that when combined, may form a waypath. The combination of parking path 220 and summoning path 224 may be the default waypath. Waypaths and sub-waypaths may be consistent with the waypaths and sub-waypaths discussed herein. A road sign 228 is shown substantially along parking path 220. Road sign 228 may include any road sign, including but not limited to regulatory signs, warning signs, guide signs (e.g., street name signs, route marker signs, expressway signs, freeway signs, welcome signs, informational signs, recreation and cultural interest signs, and the like), emergency management signs, temporary traffic control signs, school signs, railroad signs, and bicycle signs.

With continued reference to FIG. 2, in another embodiment, a portion of the vehicles 122 may follow a different path, such as path 232 that includes the fueling location 218 and the maintenance location 214. Path 232 may be transmitted to vehicles that may require fueling and maintenance, as shown in their status data. Alternatively, or additionally, a plurality of paths may be created between the locations in location 200, depending on where the vehicles need to go, which is determined as a function of their status data, as discussed above. Location 200 may include any location that may be found in a distribution center or vehicle fleet depot.

Figure 3:
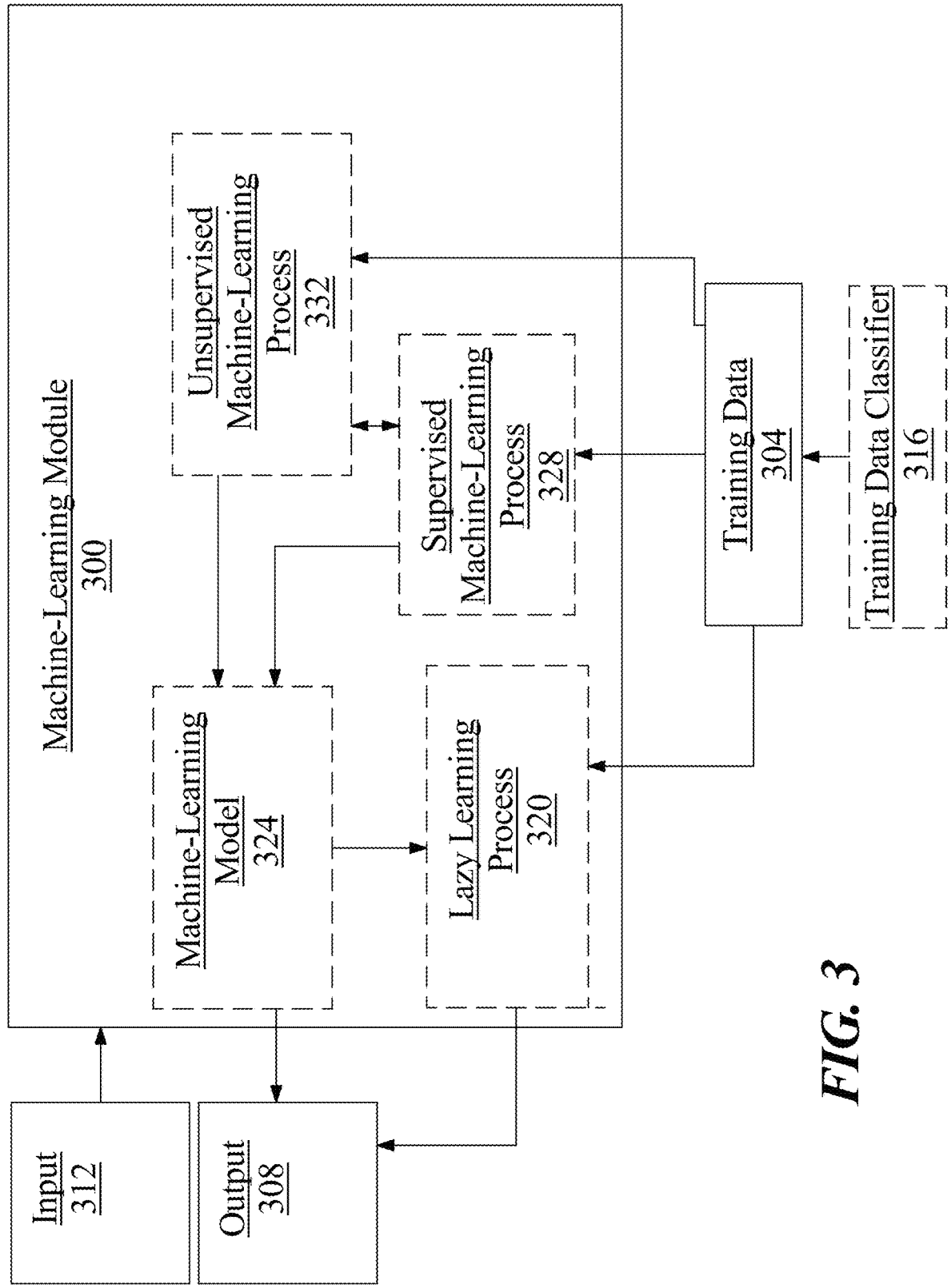
FIG. 3 is a block diagram illustrating an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatically may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to classifications of survey data, for example "verified," "unverified," "validated," "unvalidated," "compliant," "non-compliant," and the like. In some cases, training data may be further classified, for example based upon, access datum, permission datum, point of interest type (e.g., municipal building, retail building, and the like), parking location type (e.g., parking garage, parking lot, on-street parking, and the like). In some cases, a point of interest may serve a commercial interest, for example a business having a fleet of vehicles, such as without limitation a shipping company, a transit company, a rental vehicle company, a police department, and the like. In some cases, point of interest may be substantially private and not used by general public, for example a private residence. In some cases, training data may be classified according to usage, large commercial usage compared to retail or consumer usage.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include map 108 as described above as inputs, any of verification status, validation status, or surveyor metric as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
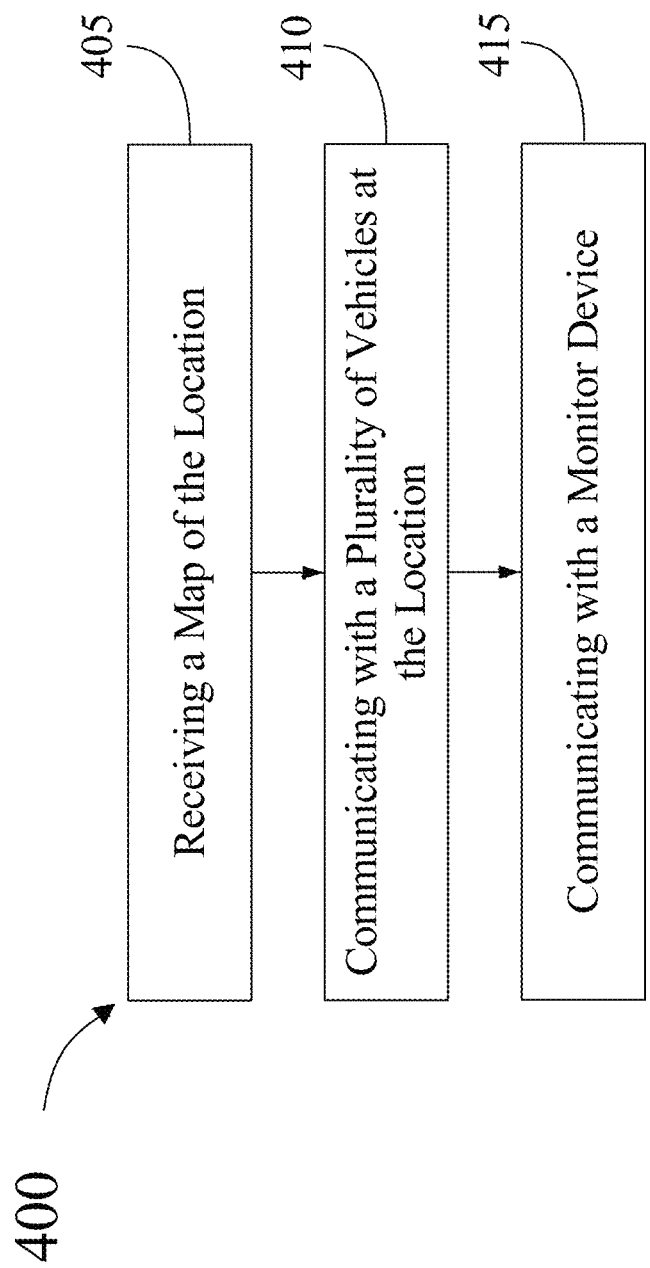
FIG. 4 is a flow diagram illustrating an exemplary method for autonomously controlling vehicles at a specified location.

Referring now to FIG. 4, an exemplary method 400 of autonomously controlling vehicles at a specified location is illustrated by way of a flow diagram. At step 405, method 400 includes receiving, using a processor, a map of a location. Processor may include any computing device described in this disclosure, for example in reference to FIGS. 1-3 and 5. Map may include any map described in this disclosure, for example with reference to FIGS. 1-3. The location includes a parking location and a fueling location. The location may be a distribution center wherein a plurality of vehicles may gather to refuel, resupply, or the like. A vehicle may be a delivery vehicle. This step may be implemented without limitation as described in FIGS. 1-5.

With continued reference to FIG. 4, at step 410, method 400 may include communicating with a plurality of vehicles at the location. Communicating with a plurality of vehicles further includes receiving status data from the plurality of vehicles. Status data may include data on a condition of each vehicle in the plurality of vehicles. Communication with the vehicles may include communicating by way of a remote device. The remote device may be located on/in each vehicle. Communicating with a plurality of vehicles further includes transmitting a waypath to the plurality of vehicles. A waypath may include a plurality of sub-waypaths. A sub-waypath may include a parking path, summoning path, and the like. The sub-waypaths may be conditionally transmitted to the plurality of vehicles based on the status data. Sub-waypaths may be determined by a user of apparatus 100. Processor may receive an updated status data from the plurality of vehicles after transmitting a waypath to the vehicles. This step may be implemented without limitation as described in FIGS. 1-5.

With continued reference to FIG. 4, at step 415, method 400 may include communicating with a monitor devices, wherein the monitor device is configured to monitor movements of the plurality of vehicles. Monitor device may be passive such that it only monitors and may not perform any actions. This step may be implemented without limitation as described in FIGS. 1-5. In some embodiments, method 400 may include a step of validating, by the processor, the waypath. This step may be implemented without limitation as described in FIGS. 1-5.

Elements of the present disclosure may be further understood with reference to exemplary parameters and ranges within the table below. Ranges below are provided for exemplary purposes and are not intended to be limiting. In some cases, ranges may be theoretically limitless, and range boundaries provided below may represent practical limits for some exemplary embodiments.

| | Min. | Nom. | Max. |
|---|---|---|---|
| No. Maps per Point of Interest (—) | 0-1 | 10 | >1,000,000 |
| No. users in with access | 0-1 (Private Map) | Variable (Shared or | >100,000,000 (Public Map) |

| | Min. | Nom. | Max. |
|---|---|---|---|
| to a map (—) | | community Map) | |
| Exemplary Accessibility | Public, private, and shared (e.g., access to more than one user, but fewer than all). | | |
| Parking Map Metric Criteria | Map usage statistics (e.g., proportion of successful uses of map), map ranking, user feedback associated with map, and the like. | | |
| Surveyor Map Metric Criteria | Value of survey(s), for example in U.S. Dollars, surveyor ranking, surveyor review, map usage statistics (e.g., proportion of successful uses of map), map ranking, user feedback associated with map, and the like. | | |
| Exemplary Locating Sensor | a global position sensor (GPS), a computer vision system, for example with pose estimation based upon feature tracking of objects, stereoscopic vision, radio-based locating sensors, for example RAdio Detection And Ranging (RADAR) and Ultra-Wideband, light-based locating sensors, for example Light Detection And Ranging (LiDAR), sound-based locating sensors, for example sound navigation and ranging (Sonar), ultrasound-based locating sensors, radio frequency identification (RFIS) sensors, Bluetooth, infrared-based locating sensors, cellular-based locating sensors, wireless local area network (WLAN) based sensors, laser-based locating sensors, and the like. | | |
| Exemplary Geofences | Drop-off geofence, pick-up geofence, parking geofence, and the like. | | |
| Exemplary Sub-Waypaths | Parking waypath, summoning waypath, and the like. | | |
| Exemplary Waypoints | Waypoints may be included in either geofences of waypath, also signage waypoints. | | |

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
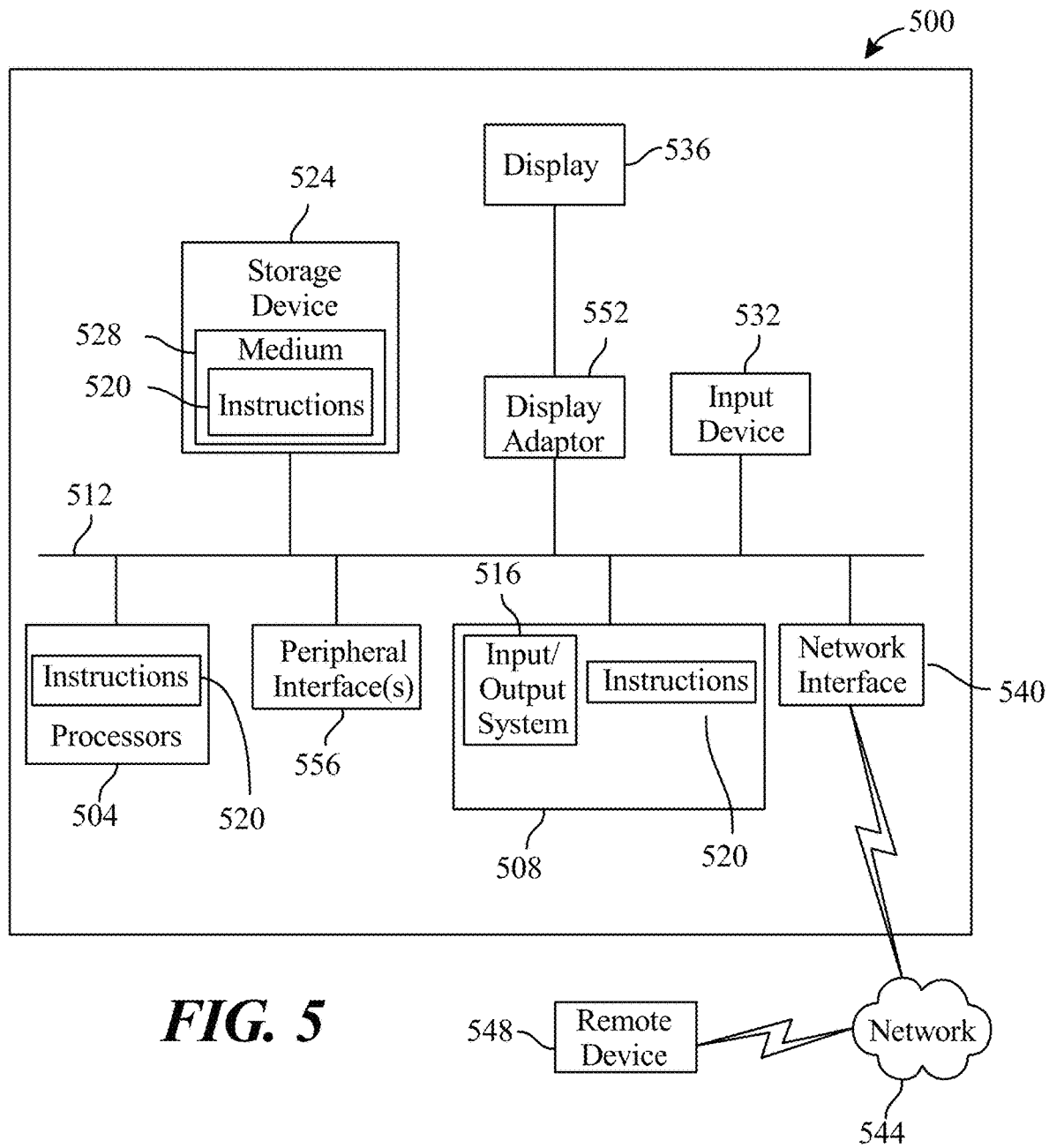
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for autonomously controlling vehicles at a specified location, the apparatus comprising:
    at least a processor; and
    a memory communicatively connected to the at least a processor, the memory containing instructions configuring the at least a processor to:
        receive a map of a location, wherein the map comprises a parking location and a fueling location;
        communicate with a plurality of vehicles at the location, wherein communicating further comprises:
            receiving status data from the plurality of vehicles;
            receiving site-specific driving rules for the location;
            determining a waypath for the plurality of vehicles based on the status data and the site-specific driving rules; and
            transmitting the waypath to the plurality of vehicles; and
        communicate with a monitor device, wherein the monitor device is configured to monitor movements of the plurality of vehicles.

2. The apparatus of claim 1, wherein the monitor device receives data on locally operated autonomous functions for each vehicle of the plurality of vehicles.

3. The apparatus of claim 1, wherein the status data comprises data on a condition of each vehicle of the plurality of vehicles.

4. The apparatus of claim 1, wherein the waypath comprises a plurality of sub-waypaths, wherein the plurality of sub-waypaths may be conditionally transmitted to the plurality of vehicles as a function of the status data.

5. The apparatus of claim 4, wherein the at least a processor is further configured to determine the plurality of sub-waypaths based on a selection by a user of the apparatus.

6. The apparatus of claim 1, wherein the waypath comprises a plurality of sub-waypaths, wherein the plurality of sub-waypaths may be conditionally performed autonomously by the plurality of vehicles as a function of the status data.

7. The apparatus of claim 1, wherein transmitting a waypath to the plurality of vehicles comprises transmitting as a function of an access datum.

8. The apparatus of claim 1, wherein the memory contains instructions further configuring the at least a processor to receive updated status data from the plurality of vehicles.

9. The apparatus of claim 1, wherein the plurality of vehicles comprises a plurality of delivery vehicles.

10. The apparatus of claim 1, wherein the location comprises a distribution center.

11. A method for autonomously controlling vehicles at a specified location, the method comprising:
    receiving, by a processor, a map of a location, wherein the map comprises a parking location and a fueling location;
    communicating, by the processor, with a plurality of vehicles at the location, wherein communicating further comprises:
        receiving status data from the plurality of vehicles;
        receiving site-specific driving rules for the location;
        determining a waypath for the plurality of vehicles based on the status data and the site-specific driving rules; and
        transmitting the waypath to the plurality of vehicles; and
    communicating, by the processor, with a monitor device, wherein the monitor device is configured to monitor movements of the plurality of vehicles.

12. The method of claim 11, wherein the monitor device receives data on locally operated autonomous functions for each vehicle of the plurality of vehicles.

13. The method of claim 11, wherein the status data comprises data on a condition of each vehicle of the plurality of vehicles.

14. The method of claim 11, wherein the waypath comprises a plurality of sub-waypaths, wherein the plurality of sub-waypaths may be conditionally transmitted to the plurality of vehicles as a function of the status data.

15. The method of claim 14, further comprising determining, by the processor, the plurality of sub-waypaths based on a selection by a user.

16. The method of claim 11, wherein the waypath comprises a plurality of sub-waypaths, wherein the plurality of sub-waypaths may be conditionally performed autonomously by the plurality of vehicles as a function of the status data.

17. The method of claim 11, wherein transmitting a waypath to the plurality of vehicles comprises transmitting as a function of an access datum.

18. The method of claim 11, further comprising receiving, by the processor, an updated status data from the plurality of vehicles.

19. The method of claim 11, wherein the plurality of vehicles comprises a plurality of delivery vehicles.

20. The method of claim 11, wherein the location comprises a distribution center.

* * * * *